Dec. 29, 1936. G. MEYER-JAGENBERG 2,065,975
PROCESS AND MEANS FOR MANUFACTURING PAPER CONTAINERS
Filed Nov. 18, 1935 5 Sheets—Sheet 2

Inventor
Günther Meyer-Jagenberg
By [signature]
Atty.

Dec. 29, 1936. G. MEYER-JAGENBERG 2,065,975
PROCESS AND MEANS FOR MANUFACTURING PAPER CONTAINERS
Filed Nov. 18, 1935   5 Sheets-Sheet 3

Inventor
Günther Meyer-Jagenberg
By [signature] Atty

Dec. 29, 1936. G. MEYER-JAGENBERG 2,065,975
PROCESS AND MEANS FOR MANUFACTURING PAPER CONTAINERS
Filed Nov. 18, 1935 5 Sheets-Sheet 4

Inventor
Günther Meyer-Jagenberg

Dec. 29, 1936.  G. MEYER-JAGENBERG  2,065,975
PROCESS AND MEANS FOR MANUFACTURING PAPER CONTAINERS
Filed Nov. 18, 1935   5 Sheets-Sheet 5

Inventor
Gunther Meyer-Jagenberg
by [signature] Atty.

Patented Dec. 29, 1936

2,065,975

UNITED STATES PATENT OFFICE 2,065,975

PROCESS AND MEANS FOR MANUFACTURING PAPER CONTAINERS

Günther Meyer-Jagenberg, Dusseldorf, Germany

Application November 18, 1935, Serial No. 50,423
In Germany November 20, 1934

13 Claims. (Cl. 93—39.3)

This invention is directed to a process and means for manufacturing paper containers of the type which include a glued length seam and which have a top diameter somewhat greater than the bottom diameter, and is more particularly directed to a process and means whereby the containers are subjected to an operative treatment during a definite period of time to insure that the glued seam will be thoroughly and properly set before the container as a whole is subjected to further treatment, to thereby avoid the possibility of the opening of the seam during such further treatment.

In the manufacture of paper containers of the type mentioned, it is, of course, imperative that a tight and solid length seam be insured. Conventionally, such containers are glued on a bag making or like machine and then further treated in other machines for waxing, turning over the upper rim or for other completing functions. In this conventional manufacture, the manufacturing speed is materially impaired as the glued containers have to remain on the mandrels of the bag making machine for a sufficient period of time to insure that the seam has reached that point of adherence that a loosening thereof during the further treatment of the container is practically prevented.

The primary object of the present invention is the provision of a feeding channel or chute arranged to receive the containers from the bag making or like machine and deliver them to the succeeding machine for further treatment, the feeding chute receiving and maintaining the containers in nested relation with the glued seam subjected to pressure and the containers removed singly from the delivery end of the chute and delivered to the subsequent treating machine, the length of movement of the nested containers through the chute and the pressure to which they are subjected while in the chute insuring that the glued seam will be effectively sealed and set before the leading container is delivered from the delivery end of the chute.

The mechanism and means for carrying out the process is illustrated in the accompanying drawings, in which.

Figure 1:
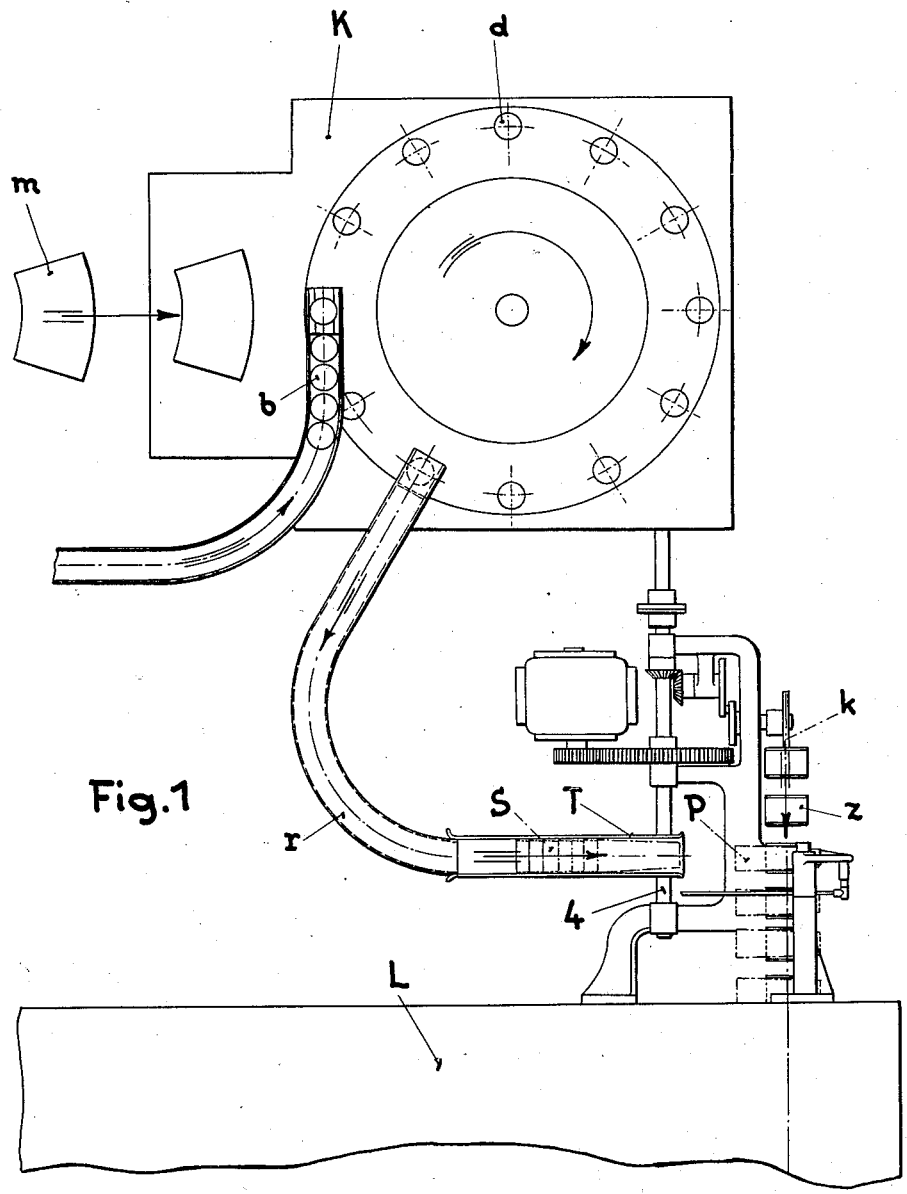
Figure 1 is a more or less diagrammatic view illustrating a bag making or like machine, a waxing or further treating machine, and a container feeding means forming the essential of the present invention arranged between such machines.

In the drawings, and with more particular reference to Figure 1, a bag making or like machine, in which the containers are initially formed and the length seam glued, is indicated at K and a further treating machine, such for instance as an impregnating machine, is shown at L. The transfer means between these machines, and which forms the subject-matter of the present invention, is indicated at T.

The blanks indicated at m and the bottom parts indicated at b necessary for the manufacture of the paper containers P are fed to the machine K in any known or conventional manner and are formed over the revolving form blocks d into a paper container of the desired character, and an element of which is, of course, the glued length seam.

The formed containers with the freshly glued seam are forced from the form blocks d into the feed chute r of the present invention. This feeding is preferably done by a blast of air which forms no particular part of the present invention and which is not, therefore, illustrated. The primary delivery of the containers from the blocks d into the chute r, while preferably effected by a blast of air, may be otherwise carried out, as desired.

The containers, traveling through the chute r, are delivered into the lower end of such chute which is constructed and arranged to form a nesting section T in which the containers P will naturally assume a nested form, as indicated at S in Figure 1. The arrow indications on this figure show the direction of travel of the containers.

Supported at one side or below the nesting section T of the feed chute is a shaft I, to the lower end of which is secured a lever 2 having a terminal roller 3 designed to cooperate with a cam 5 mounted on and operated by an appropriately driven shaft 4. This detail is shown more particularly in Figure 3.

The nesting section T includes a fixed plate e shaped to receive and support one side or a portion of the container. An angle plate e' is secured to the plate e, extending in its main length at right angles to such plate, with its free end pivotally supporting at 9 a lever 10 which extends across and beyond the nested containers and downwardly on the side opposite the angle plate, the free end of the lever 10 being influenced toward the containers by a spring 11.

Secured upon the shaft 1 is a lever 6 which extends upwardly past the nested containers on the side opposite the angle plate e', with the upper end of this lever 6 influenced toward the nested containers by a spring 7 connected to said lever and to the angle plate e'. The lever 6 carries a roller 12 disposed below the lever 10 and operative to raise such lever 10 on its pivotal support 9 in the swinging of the lever 6 away from the nested containers.

The angle plate e', the lever 6 and the lever 10 carry pressing sections 13, which pressing sections are of less width than the diameter of the containers and are preferably provided on their container engaging surfaces with a flexible section g, preferably of rubber. As arranged, it will be apparent that the pressing section 13 of the angle plate e' is fixed while the pressing sections 13 of the respective levers 6 and 10 are movable toward and from the nested containers in the movement of such levers.

Figure 3:
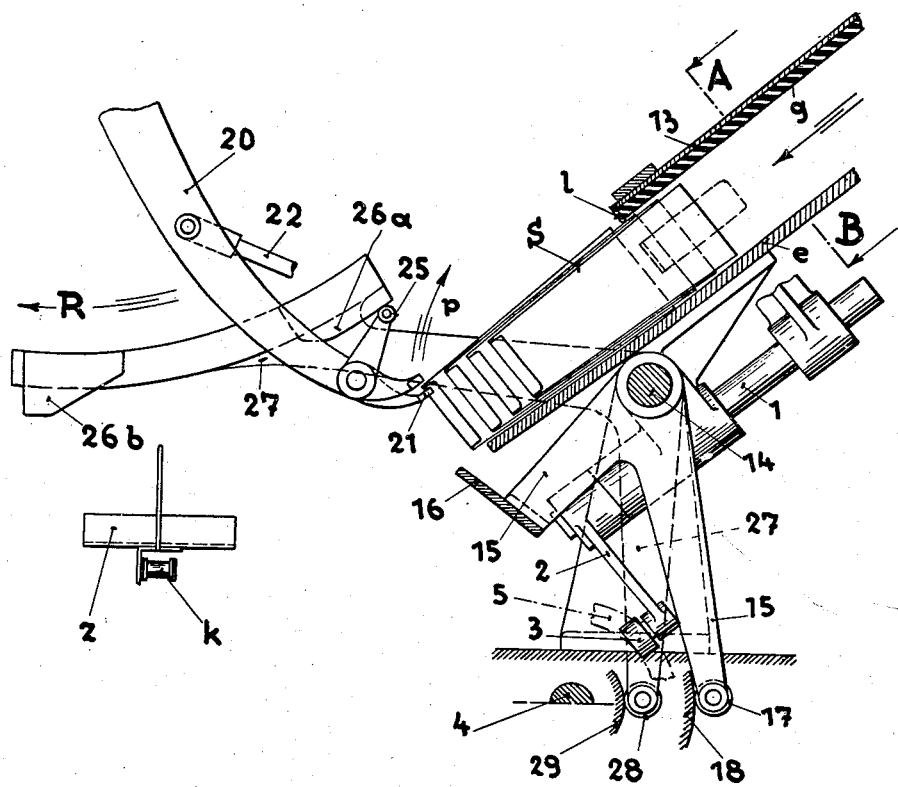
Figure 3 is a similar view on an enlarged scale showing the feeding chute in section.

The supporting plate e extends to the delivery end of the nesting device while the pressing sections 13 terminate short of the delivery end for a distance slightly exceeding the length of one container, and the lower or free forward ends of the pressing sections are formed with toothed bars l which, as illustrated more particularly in Figure 3, serve to positively engage the second container of the nested containers in order to hold such second container and the others in rear thereof during delivery or withdrawal of the first or leading container, which latter, of course, is free of the holding function of the toothed bars l.

Figure 4:
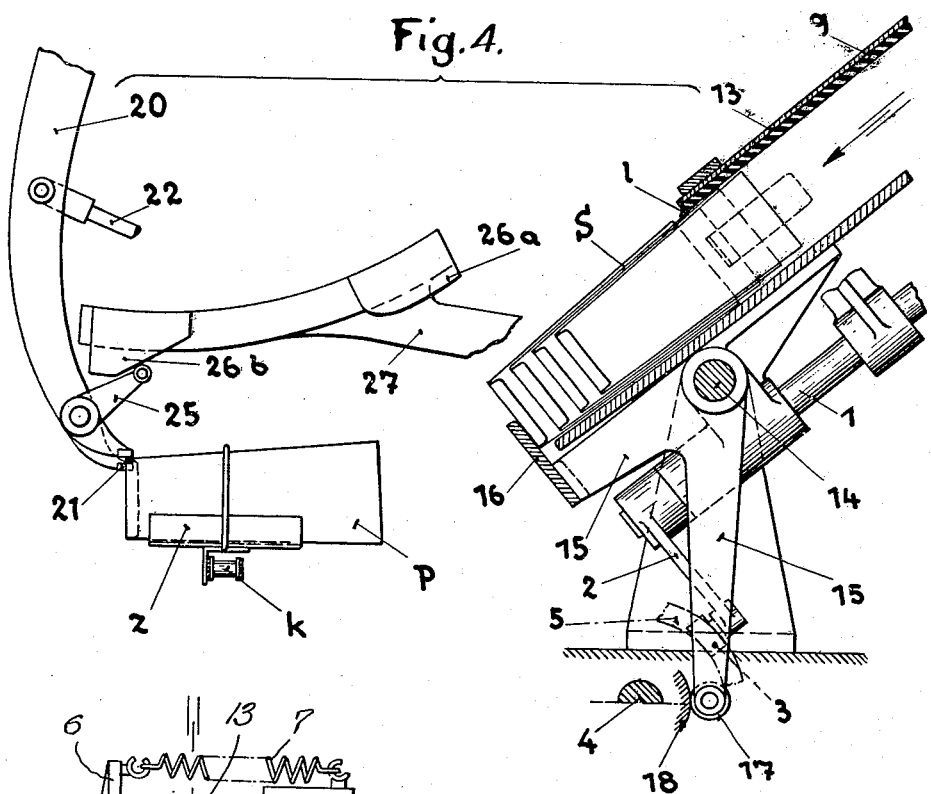
Figure 4 is a view similar to Figure 3, with the parts in a different operating position from that shown in Figure 3.
Figure 5:
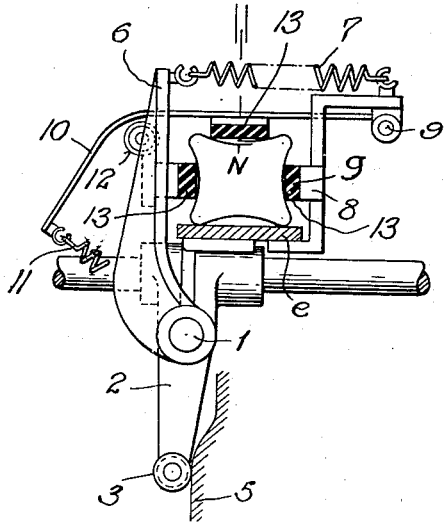
Figure 5 is a transverse section on the line A—B of Figure 3.

On the shaft 14 extending transverse the shaft 1 is a two-armed lever 15, one arm of which is terminally provided with a lever 17 to be operated and engaged by a cam 18 mounted on the shaft 4. The other arm 15' of the lever extends at an angle to the arm 15 and carries a stop plate 16 which in one position of the lever is designed to overlie a portion of the forward end of the leading container, as illustrated in Figure 4, and in another position of such lever to be moved to free such leading container, as illustrated more particularly in Figure 3 of the drawings.

A delivery arm 20 swingingly supported at 19 is terminally provided with a gripper 21. The fixed jaw of the gripper 21 is part of the arm 20. The movable jaw is pivotally supported upon the arm 20 and includes an angularly related lever having a terminal roller 25. The jaws of the gripper are formed to effectively grip one edge of the bottom of the leading container, as illustrated in Figure 3, and the gripping jaws are normally maintained in closed relation by a spring (not shown).

Figure 2:
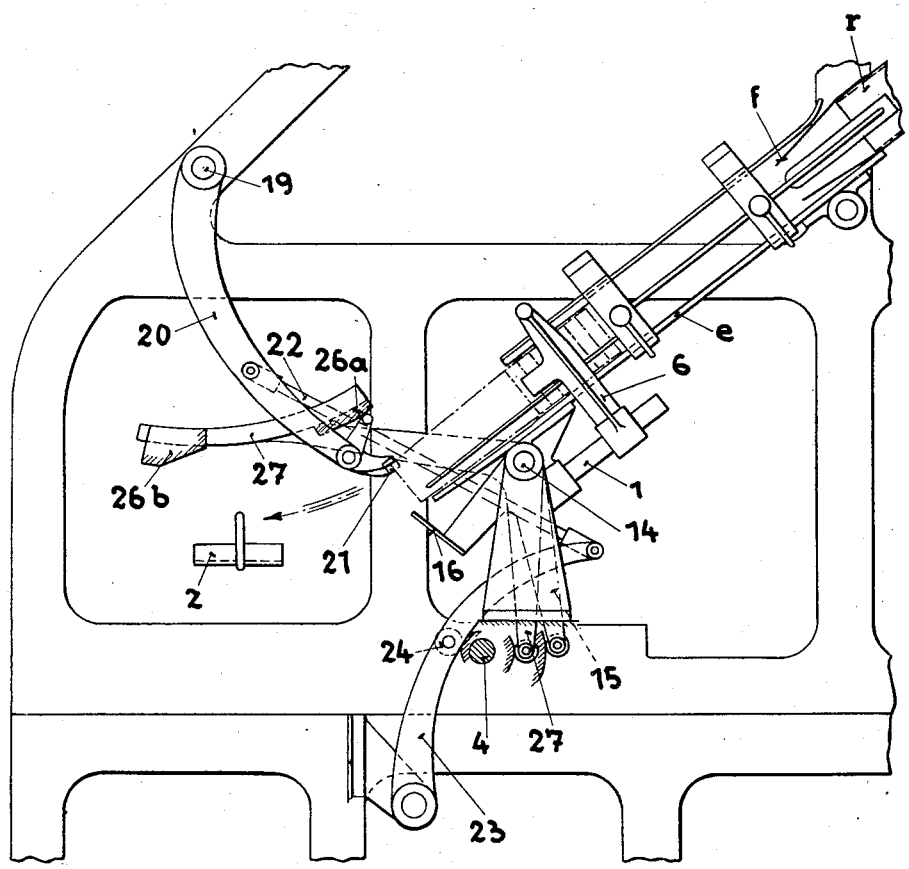
Figure 2 is a side elevation, partly in section, of the improved container feeding means.

The arm 20 is swung from a position to grip a container to a position to deliver the gripped container to the succeeding treating machine and is operated for this movement through a rod 22 connected at one end to the arm 20 and at the opposite end to a lever 23 pivotally supported on the framework and carrying a roller 24 to be engaged by a cam 29 on the shaft 4, as shown more particularly in Figure 2.

The gripper jaws are normally closed and, of course, must be opened in order to effect a gripping of the leading nested container and again opened to release such container for succeeding treatment. To secure this result, a gripper controlling plate 27 is supported by and connected to a lever 27' supported upon the shaft 14 and controlled by a cam which may be cam 29 on the shaft 4. The gripper controlling plate 27 is provided at one end with a cam offset 26ª and with a second cam offset 26ᵇ and these offsets are arranged so that under movement of the lever 27', they will, at proper moments, influence the gripper jaws, or more particularly the movable jaw, through the lever 25 of such jaw, to open the jaws.

As so far described, the operation of the nesting section of the feeding chute is as follows:

By means of a current of blast air, the paper containers P are transferred through the pipe r into the pile S. Spring-loaded tongues f guide each paper container in such a way that it properly enters the upper end of the pile S.

The paper containers P are removed from the lower end of the pile and conveyed into the cells z of the chain k of the machine L, by means of the gripper 21 arranged on the lever 20. The gripper 21 is swinging to and fro. Figure 3 shows the gripper in the moment in which a paper container P is removed from the pile S. The stop 16 is swung aside by means of the cam 18, the roller 17, and the angle lever 15, so that the removal of the paper containers is not prevented by the stop. In the moment in which the jaws of the opened gripper have reached the collar of the lowermost paper container, the lever 27 and the cam part 26ª fastened to this lever are slightly swung upwards by means of the cam 29 in such a way that the gripper closes by the effect of a spring not to be seen in the illustration. The arm 20 carrying the gripper 21 is now turned in the direction of the arrow R. In order that only one paper container is removed from the pile, the toothed bars Kl which are arranged on the pressing pieces 13 press against the upper rim of the penultimate paper container and thereby keep the pile in position.

As soon as the lowermost paper container has been removed from the pile by the gripper 21, the stop 16 turns upwards into the position illustrated in Figure 4. As soon as the stop has reached this position, the lever 6 is removed from the pile by means of the cam 5. By this the roller 12 touches the bent front end of the lever 10 and lifts it. The pressure of the pressing parts 13 against the pile is thereby loosened for a short time so that the pile can slide down as far as it touches the stop 16. After this, the pressing pieces 13 are again pressed against the pile, controlled by the cam 5. The pressing piece 13 which is arranged on the lever 10 is of special importance; it presses against that side of the pile S where the glued seams N are placed.

When the gripper 21 turns in the direction of the arrow R and by this conveys the paper container P into the cell z of the chain k, the lever 25 touches the cam portions 26ᵇ, whereby the gripper 21 is opened. The paper container remains in the cell whilst the gripper swings slightly further. During this further movement of the gripper, the chain is moving on. The gripper 21 now returns through the still empty cell z which has arrived in its reach. In the meantime, the cam portions 26$^a$ and 26$^b$ arranged on the lever 27 go down. When the gripper 21 enters within the reach of the pile S, the gripper is already opened by means of the cam 26$^a$ which acts against the lever 25. Now also the stop 16 is swung downwards by means of the cam 18. The working operation can start again.

In the nesting device described each single paper container has to pass the whole pile. Each paper container remains, therefore, in the pile for a certain time. Whilst the paper container remains in the pile, the length seam N is especially pressed by the pressing piece 13 arranged on the lever 10, so that the length seam of the paper container removed from the lower end of the pile is embedded sufficiently tight.

At a certain working speed of the gripper 21, the time which the paper container remains in the pile depends upon the length of the pile. In order that the time which the container remains in the pile is sufficient for embedding of the length seam, care has to be taken that the pile always has an adequate length. For this purpose a feeler F is oscillatingly arranged according to Figure 7. To this oscillating feeler F a lever 30 is attached. By means of the spring 31 the ratchet 32 is connected with the lever 30 mentioned and arranged on the feeler F.

On the oscillating lever 27 carrying the two cam portions 26$^a$ and 26$^b$, a rod 33 is arranged which is controlled by a guide 34 and which carries a stop 35. If the feeler (as demonstrated in Figure 7) is operated owing to the shortness in length of the pile S, the oscillating lever 27 carrying the cam portions 26$^a$ and 26$^b$ cannot be swung in the direction of the arrow $p$ because the movement of the rod 33 attached to the angle lever 27 is blocked by means of the ratchet 32 against which the stop 35 places itself.

Figure 7:
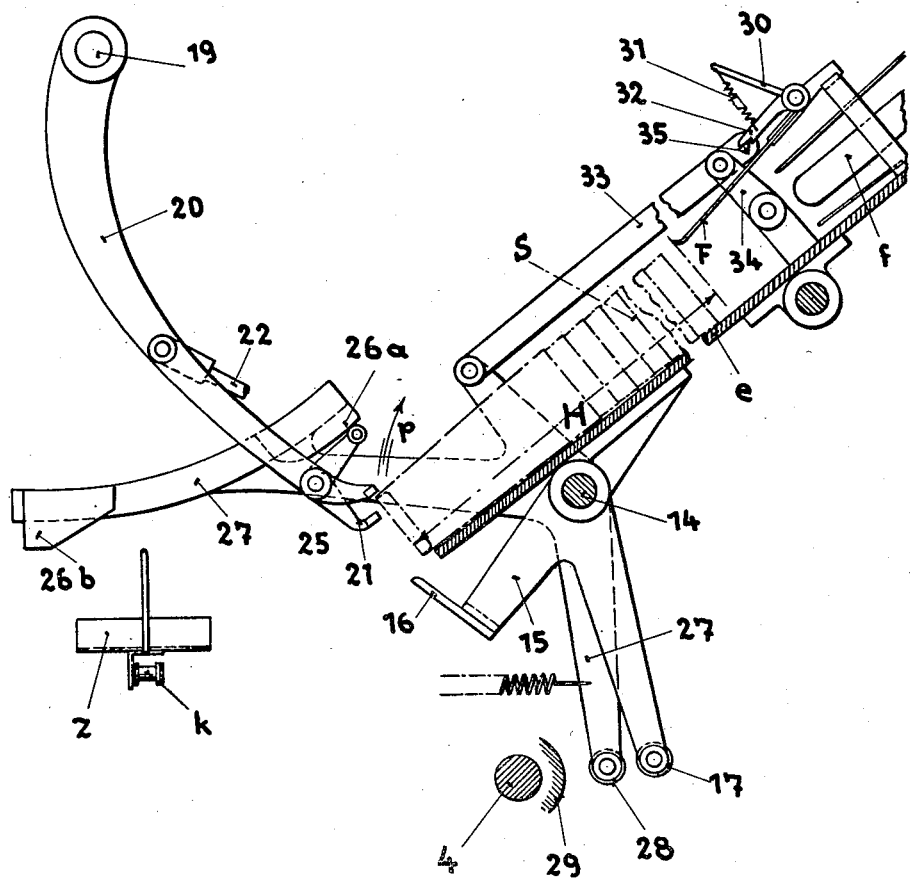
Figure 7 is a view in elevation, partly in section, including means for insuring that a proper length of nested containers be in the chute to maintain a sufficient time period for each container to insure accurate fixing of the seam.
Figure 6:
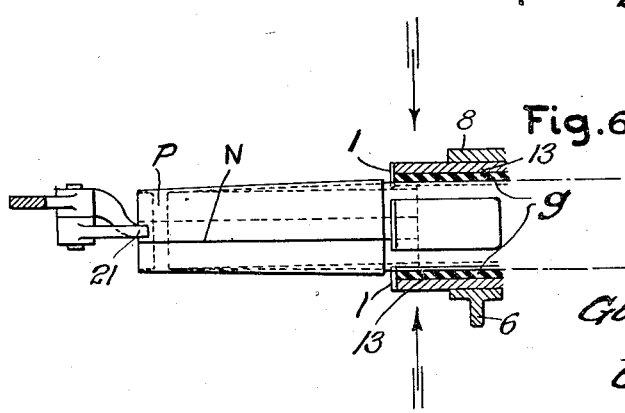
Figure 6 is a view, partly in section, illustrating more particularly the nested relation of the containers and the application of the pressure to the glued seam.

In the position of the feeler F and the ratchet 32, as demonstrated in Figure 7, the gripper 21 will not be opened; no paper container P is being taken out of the pile S as long as the pile has not reached the length H. As soon as the length of the pile exceeds the measure H, the feeler F is swung out and the ratchet 32 withdrawn by the spring 31.

The feeler F is easily movable. When displacing the feeler F by the paper containers fed into the pile, it is not as if the friction between the ratchet 32 and the stop 35 has to be overcome. In the position of the oscillating lever 27 and the rod 33, as demonstrated in Figure 7, the ratchet 32 is in the first instance still kept by the stop 35. As soon, however, as the lever 27 is moving opposite to the direction of the arrow $p$ and the stop 35 is withdrawn by means of the rod 33, the ratchet follows the movement of the feeler F and withdraws from its working position.

From the above description, it will be apparent that the process involved includes the feeding of the containers singly from a forming machine to a treating machine and maintaining them during such feeding under seam pressure for such length of time as will insure a proper setting of the glued seam to prevent an opening of said seam during further treatment of the containers.

What is claimed to be new is:

1. A process for manufacturing paper containers of the type including a glued length seam, consisting in forming the containers and transferring the formed containers from the forming machine for delivery to a subsequent treating machine, said containers during transfer being maintained in nested relation for a period of time sufficient to insure setting of the glued seam, the containers being delivered singly from their nested relation to the subsequent treating machine.

2. A process for manufacturing containers of the type including a glued length seam, consisting in forming the containers, transferring the containers from the forming machine to a place of subsequent treatment, nesting the containers during such transfer for maintaining seam pressure between the nested containers, maintaining the containers nested during transfer for a period sufficient to permit the setting of the glued seam, removing the containers separately from such nested relation without disturbing the remaining nested containers, and delivering the removed container for subsequent treatment.

3. A process for the manufacture of paper containers of the type having a glued length seam, consisting in forming the containers, transferring the containers from the forming machine to a place of subsequent treatment, arranging the containers during transfer in nested relation, to maintain inner and outer pressure on the seams of the respective containers, subjecting the nested containers in line with the seam to external pressure, and removing the advanced container from the nested containers for single delivery to the place of subsequent treatment.

4. A step in the process of manufacturing containers of the type having a glued length seam and wherein the containers are formed, transferred after forming to a place of subsequent treatment, and delivered singly to such place of subsequent treatment, said step consisting in nesting the containers during transfer to insure pressure contact of the seams of the nested containers and maintaining this nested relation for a period of time to permit setting of the seam, each container of the nested containers being withdrawn therefrom singly without disturbing the relation of the remaining nested containers for delivery to the place of subsequent treatment.

5. A process for the manufacture of containers having a glued length seam, consisting in forming the containers with such glued length seam, transferring the containers while the seam is wet, compelling the respective containers in successive order to exert pressure upon the glued length seam of preceding and succeeding containers for a length of time sufficient to cause said seam to set, and thereafter delivering the containers singly for subsequent treatment in the manufacture of the containers.

6. A feeding means for use in delivering containers from a forming machine to a treating machine, said means including a chute in which the containers from the forming machine are disposed in nested relation, means for gripping the leading container to remove it from the nested pile for delivery to the treating machine, and means for preventing movement of the leading container of the nested containers during the delivery of the gripped container beyond such nested containers.

7. A feeding means for use in delivering containers from a forming machine to a treating machine, said means including a chute in which the containers from the forming machine are disposed in nested relation, means for gripping the leading container to remove it from the nested pile for delivery to the treating machine, and means for exerting pressure on the seams of the nested containers, said means being relieved in the movement of the nested containers toward delivery position.

8. A feeding means for use in delivering containers from a forming machine to a treating machine, said means including a chute in which the containers from the forming machine are disposed in nested relation, means for gripping the leading container to remove it from the nested pile for delivery to the treating machine, means for exerting pressure on the seams of the nested containers, and members carried by the pressure means to prevent movement of that container of the nested containers immediately succeeding the leading container during gripping delivery of the latter.

9. A feeding means for use in delivering containers having a glued length seam from a forming machine to a treating machine, said means including a chute in which the containers from the forming machine are disposed in nested relation while the glued length seams are wet, said containers being fed lengthwise said chute for a period of time sufficient to permit the glued length seams to set, and means for gripping the leading container to remove it individually from the nested pile for delivery to the treating machine.

10. A feeding means for use in delivering containers having a glued length seam from a forming machine to a treating machine, said means including a chute in which the containers from the forming machine are disposed in nested relation while the glued length seams are wet, said containers being fed lengthwise said chute for a period of time sufficient to permit the glued length seams to set, means for gripping the leading container to remove it individually from the nested pile for delivery to the treating machine, and means for exerting external pressure on the seams of the containers while in nested relation.

11. A feeding means for use in delivering containers having a glued length seam from a forming machine to a treating machine, said means including a chute in which the containers from the forming machine are disposed in nested relation while the glued length seams are wet, said containers being fed lengthwise said chute for a period of time sufficient to permit the glued length seams to set, means for gripping the leading container to remove it individually from the nested pile for delivery to the treating machine, and means for exerting external pressure on the seams of the containers while in nested relation, said pressure exerting means being relieved during delivery of the leading container from the nested containers.

12. Mechanism for manufacturing containers of the type including a glued length seam and formed to permit nesting, including a nesting chute to which the containers are delivered from the forming machine and in which the containers are nested, releasable holding means for normally preventing delivery of the containers beyond the chute, gripping means operative for removing the leading container, means for exerting pressure on the seams of the nested containers while in nested relation, and means for holding the containers against movement longitudinally of the nesting chute during delivery of the leading container.

13. Mechanism for manufacturing containers of the type including a glued length seam and formed to permit nesting, including a nesting chute to which the containers are delivered from the forming machine and in which the containers are nested, releasable holding means for normally preventing delivery of the containers beyond the chute, gripping means operative for removing the leading container, and means for exerting pressure on the seams of the nested containers while in nested relation, said holding means being automatically rendered inoperative during delivery of the leading container.

GÜNTHER MEYER-JAGENBERG.